United States Patent [19]
Zaharris

[11] Patent Number: 5,784,216
[45] Date of Patent: Jul. 21, 1998

[54] METHOD AND APPARATUS FOR RECORDING DEFECTIVE TRACK IDENTIFICATION INFORMATION IN A DISK DRIVE

[75] Inventor: Dan Zaharris, Longmont, Colo.

[73] Assignee: Seagate Technology, Inc., Scotts Valley, Calif.

[21] Appl. No.: 559,328

[22] Filed: Nov. 16, 1995

[51] Int. Cl.⁶ ...................................... G11B 5/09
[52] U.S. Cl. .................... 360/48; 360/50; 360/55; 360/60
[58] Field of Search ....................... 360/48, 49, 50, 360/53, 60; 369/58; 371/2.1

[56] References Cited

U.S. PATENT DOCUMENTS

| | | | |
|---|---|---|---|
| 4,498,146 | 2/1985 | Martinez | 360/31 X |
| 4,792,917 | 12/1988 | Takamatsu et al. | 360/53 X |
| 4,916,557 | 4/1990 | Okamura | 360/48 |
| 4,918,651 | 4/1990 | Bonke et al. | 364/900 |
| 4,924,331 | 5/1990 | Robinson et al. | 360/49 X |
| 5,253,131 | 10/1993 | Chevalier | 360/78.14 |
| 5,274,509 | 12/1993 | Buch | 360/48 |
| 5,321,558 | 6/1994 | Tackett | 360/50 X |
| 5,438,559 | 8/1995 | Best et al. | 369/54 |
| 5,455,721 | 10/1995 | Nemaize et al. | 360/51 |
| 5,500,848 | 3/1996 | Best et al. | 369/275.3 |
| 5,523,903 | 6/1996 | Hetzler et al. | 360/77.08 |
| 5,590,311 | 12/1996 | Matsushima | 360/50 X |
| 5,596,460 | 1/1997 | Greenberg et al. | 360/49 X |

Primary Examiner—Aristotelis M. Psitos
Assistant Examiner—Alan Faber
Attorney, Agent, or Firm—Kinney & Lange, P.A.

[57] ABSTRACT

An apparatus and a method for operating a disk drive are described where defect information is written in a field other than an identification (ID) or header field in a data sector. Rather, defect information is written to a field, preferably an unused field like a sector gap or write-to-read gap. By placing defect information in the sector gap, or the like, disk capacity for user data is improved. Also, as in headerless and merged identification data formats, defect information does not need to be stored in an off-disk memory such as a random access memory (RAM).

48 Claims, 3 Drawing Sheets

METHOD AND APPARATUS FOR RECORDING DEFECTIVE TRACK IDENTIFICATION INFORMATION IN A DISK DRIVE

FIELD OF THE INVENTION

The present invention is directed to disk drives. More particularly, the present invention provides an apparatus and method for recording defective track information on a disk surface implemented with a headerless or merged identification data format.

BACKGROUND OF THE INVENTION

Disk drives are commonly used in workstations, personal computers, laptops and other computer systems to store large amounts of data in a form that can be made readily available to a user. In general, a disk drive comprises a magnetic disk that is rotated by a spindle motor. The surface of the disk is divided into a series of data tracks that extend circumferentially around the disk. Each data track is divided into a series of data sectors and store data in the form of magnetic transitions on the disk surface.

In a conventional disk drive design, each data sector of a data track is divided into a number of fields, including an address header field that contains magnetic transitions representing unique identification information for the specific data stored in the data sector. In this manner, the disk drive system can locate and verify the exact data sector for any particular block of data that a host computer may require, e.g., in a read operation. Among the information stored in an address header field is head identification information to uniquely identify the particular head of a head stack assembly that is transducing the magnetic transitions, track number, data sector identification and track defect information.

The track defect information identifies a segment or segments of the data track that are defective and therefore cannot be used to store data. Defects can be caused, e.g., by dust particles or other contaminants on a disk surface. When the host computer requires data stored at an address that corresponds to a defective track segment, the defect information recorded within a header of the track containing the defective segment will indicate where on the disk surface the required data is now stored. In this manner, use of the disk drive can continue, with management of defective track segments being transparent to the host computer.

Overhead refers to portions of a disk surface that are used to store information necessary for the control of the disk drive. Space on a disk surface used to store control information is not available to store data, and thus reduces the storage capacity of the disk drive. The address headers discussed above are examples of overhead. One proposal for increasing the storage capacity of a disk drive is referred to as a headerless data format. In a headerless format, the headers are removed from the data fields to reduce overhead and thereby free up additional space on the disk surfaces that can then be used to store data. The information usually recorded within the headers is stored in RAM memory available in the disk drive electronics system. Careful monitoring of signals read from a disk surface is relied upon to associate the data fields on the disk surface with the complementary RAM information containing the unique identification information. In a merged identification data format, the headers are also removed, but the identification information remains on the disk and is merged with the data in the data field. Since the data field is used for both reading and writing of information, defect information is not located in the data field. The traditional approach in a merged identification format is to have the drive microprocessor keep a look-up table of the defect locations.

Therefore, in a headerless format and in a merged identification format, defect information is stored in RAM memory in the form of a table listing defective portions of disk surfaces. When a host wants access to data stored in the disk drive, it provides a logical or virtual address to the disk drive control electronics system. The control electronics system then translates the logical address into a physical address indicating the location of the data within the data tracks of the disk. During an address translation process, the control electronics system looks up defect information in the table for each address being translated to determine whether the address is affected by a defect, and if so, where the data is presently stored within the disk drive. However, a defect look-up table can require a large amount of memory space and imposes computational overhead on address translation processing.

SUMMARY OF THE INVENTION

The present invention provides a defect management system that can be used in a headerless format or merged identification format disk drive without the need for a defect look-up table. According to an embodiment of the present invention, other overhead areas on the disk surface are further utilized to store defect information when headers are unavailable for that purpose. For example, a gap field (such as a sector gap field) can be used to store defect information. A sector gap is arranged to physically separate one data sector of a data track from a following data sector or servo sector.

Typically, the sector gap fields are used as write-to-read gap fields to provide time for the disk drive to transition from a write operation to a read operation. In a conventional disk drive, the sector gap is devoid of recorded information since the head is ordinarily neither reading nor writing data during the transition from a write to a read operation. The overhead functionality of the sector gap is limited to times when a disk drive is in a transition from a write operation to a read operation. During such a transition, it does not matter what appears in the sector gap. Thus, defect information for the track can be recorded in each sector gap of the track, so that the information is repeated along the track.

As an example, disk drives can include one or more magnetoresistive (MR) heads. Such heads typically include at least two transducer components: a magnetoresistive element and a magnetic coil. Each of the magnetoresistive element and magnetic coil are arranged in a separate transducer gap formed in the head. The magnetoresistive element is used only during a read operation, where magnetic fluctuations on the disk vary the effective resistance of the element. Thus, by applying a voltage across the magnetoresistive element, magnetic fluctuations on the disk are converted into an A.C. current signal. During a write operation, the separate magnetic coil portion of the head is used. In a manner known to those skilled in the art, a magnetic field is created in the coil which is imparted to the surface of the disk.

The magnetoresistive element and the magnetic coil are generally located over the tracks on the disk surface. However, due to the physics of "flying" a head over the surface of the disk and the location of each transducer in a separate transducer gap, there is a transducer gap skew as between each of the magnetoresistive element and magnetic coil and the track centerline. In other words the angles made between the transducer gaps of the head and the disk surface are different and generally not uniform across the surface of the disk.

As stated above, when transitioning from a write operation to a read operation, information in the write-to-read gap is not used by the drive. Rather, the write-to-read gap serves as a time delay to allow a change of operations in the head. These changes include allowing the preamp to go from a write mode to a read mode, unloading current in the coil, and allowing A.C. coupling in the read channel to recover from a D.C. shift. Nominally a head in a disk drive is geared for a read mode (an operation which is done most of the time). Generally, no gap is needed for changing from a read to a write operation because there is no current to be unloaded in the coil and switching the preamp from a read mode to a write mode is done extremely quickly.

When performing a seek operation from one track to another, the drive (specifically the head) is in a read operation. The time delay feature of the write-to-read gap is therefore not needed during a seek since no write operation is needed during that time. Once the head is located proximately to the destination track, the drive enters a settle mode where the head is fine-positioned over the destination track. During the settle mode the head can pass over the destination track several times before it is fine positioned (as best as tolerances will allow) over the destination track. Thus, a head has several opportunities, during a settle mode, to read information contained in at least one gap such as a write-to-read gap.

During a seek operation, and especially during the settle mode, the head can read defect ID information contained in the write-to-read gap. The defect information stored in a write-to-read gap in the destination track would indicate a defect in the destination track and may indicate a new location for the desired write or read operation.

According to a further embodiment of the present invention, the defect information is written redundantly in more than one write-to-read gap in a particular track. Preferably, the redundant defect information for a given track is written in all such write-to-read gaps in the track. In doing so, the probability that the defect information will be read during the seek operation (especially during the settle mode) is increased. So long as one gap is traversed containing defect information during a settle mode, the proper handling of this information takes place.

Pursuant to another feature of the present invention, gaps, such as write-to-read gaps, are used to record information other than defect information. For example, selected control and/or identification information ordinarily recorded on a disk surface as part of the required overhead, can be written into write-to-read gaps to reduce the overall overhead imposed on a disk surface. Such information can include head, cylinder and sector numbers to identify the data sector following the gap, and ordinarily recorded in a header. Another example provides for servo control information relevant to a subsequent servo sector (e.g., an indication that the next servo burst will be bad and should be skipped).

With the method and apparatus of the present invention, a nonvolatile storage of defect information is provided. This leads to an increase in the throughput of user data and other essential information and an improved format efficiency.

DETAILED DESCRIPTION

Figure 1:
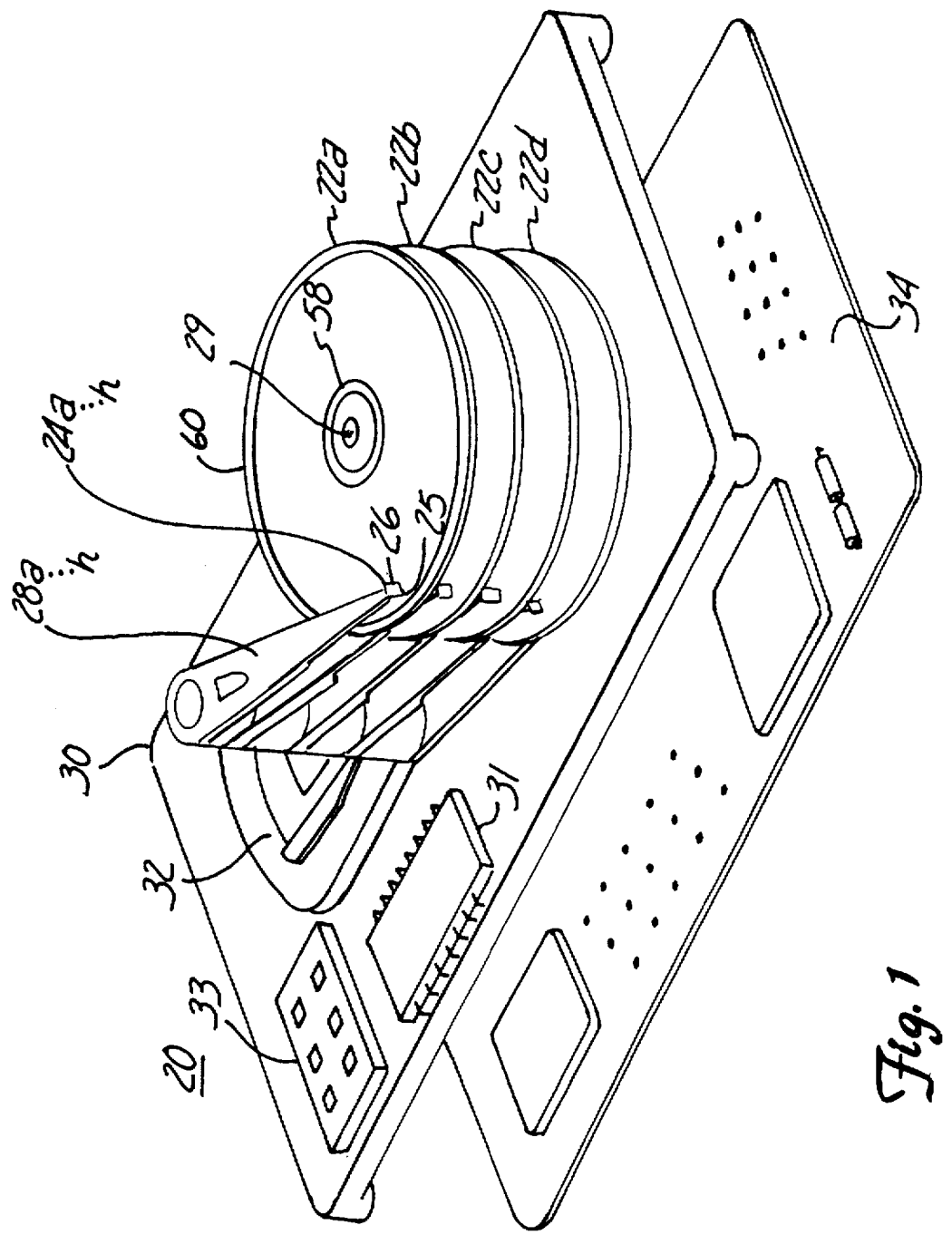
FIG. 1 is perspective view of an exemplary disk drive.

Referring now to the drawings, and initially to FIG. 1, there is illustrated an example of a disk drive designated generally by the reference numeral 20. The disk drive 20 includes a stack of storage disks 22a–d and a stack of read/write heads 24a–h. Each of the storage disks 22a–d is provided with a plurality of data tracks to store user data. As illustrated in FIG. 1, one head is provided for each surface of each of the disks 22a–d such that data can be read from or written to the data tracks of all of the storage disks. It should be understood that the disk drive 20 is merely representative of a disk drive system utilizing the present invention and that the present invention can be implemented in a disk drive system including more or less storage disks.

The storage disks 22a–d are mounted for rotation by a spindle motor arrangement 29, as is known in the art. Moreover, the read/write heads 24a–h are supported by respective actuator arms 28a–h for controlled positioning over preselected radii of the storage disks 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disk surfaces.

Each of the read/write heads 24a–h is mounted to a respective actuator arm 28a–h by a flexure element (not shown) and comprises a magnetic transducer 25 mounted to a slider 26 having an air bearing surface (not shown), all in a known manner. Alternatively, each of the read/write heads 24a–h can be an MR head as known in the art. As typically utilized in disk drive systems, the sliders 26 cause the magnetic transducers 25 of the read/write heads 24a–h to "fly" above the surfaces of the respective storage disks 22a–d for non-contact operation of the disk drive system, as discussed above. When not in use, the voice coil motor 32 rotates the actuator arms 28a–h during a contact stop operation, to position the read/write heads 24a–h over a respective landing zone 58 or 60, where the read/write heads 24a–h come to rest on the storage disk surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h, to control the transfer of data to and from the data tracks of the storage disks 22a–d. The manner for coupling the PCB 34 to the various components of the disk drive is well known in the art.

Figure 2:
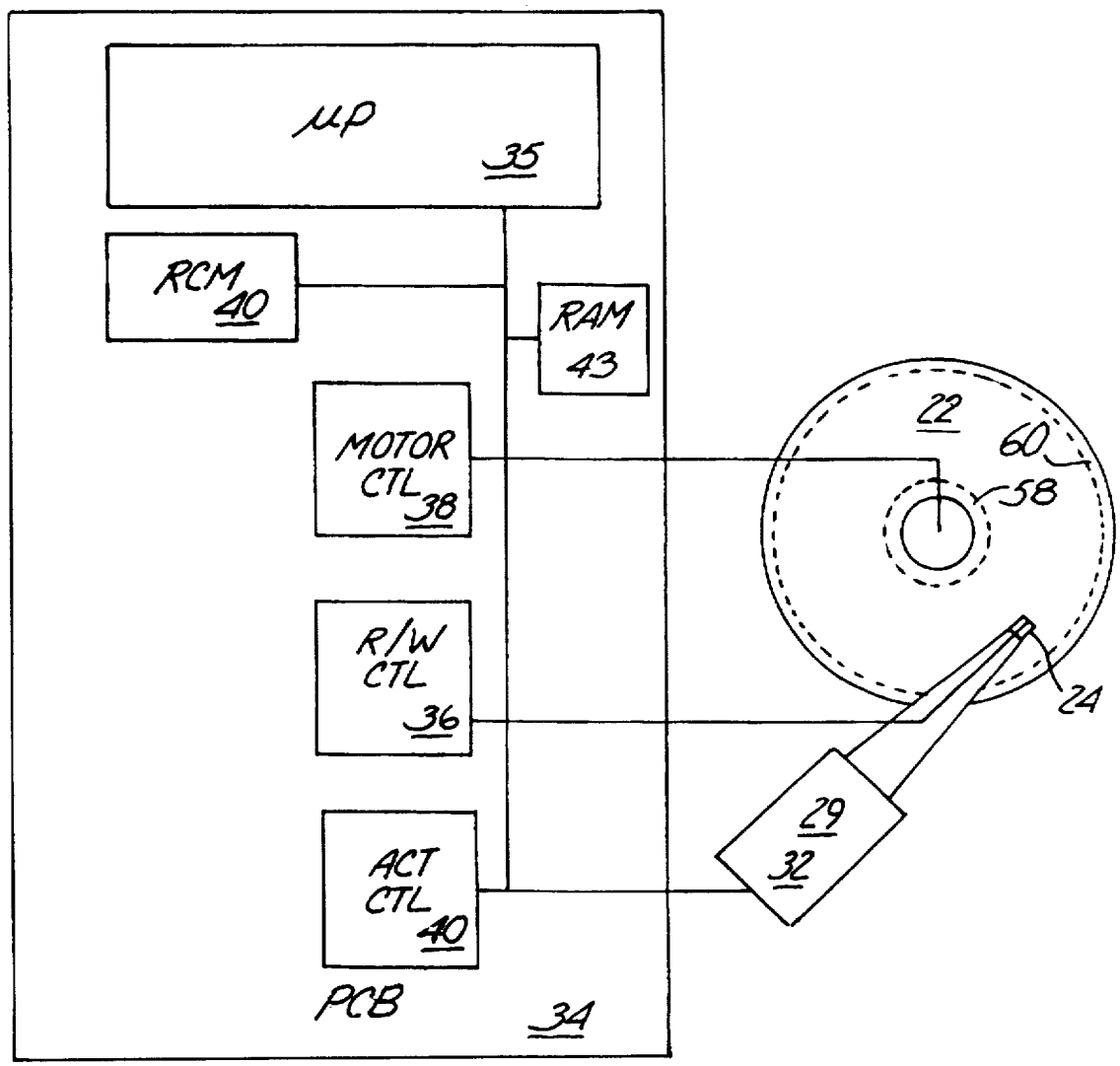
FIG. 2 is a top plan view of the printed circuit board of the disk drive of FIG. 1.

Referring now to FIG. 2, there is illustrated in schematic form the PCB 34 and the electrical couplings between the control electronics on the PCB 34 and the components of the disk drive system described above. A microprocessor 35 is coupled to each of a read/write control 36, spindle motor control 38, actuator control 40, ROM 42 and RAM 43. In modern disk drive designs, the microprocessor can comprise a digital signal processor (DSP). The microprocessor 35 sends data to and receives data from the storage disks 22a–d via the read/write control 36 and the read/write heads 24a–h.

The microprocessor 35 also operates according to instructions stored in the ROM 42 to generate and transmit control signals to each of the spindle motor control 38 and the actuator control 40.

The spindle motor control 38 is responsive to the control signals received from the microprocessor 35 to generate and transmit a drive voltage to the spindle motor 29 to cause the storage disks 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage disks 22a–d. The magnitude and polarity of the voltage generated by the actuator control 40, as a function of the microprocessor control signals, determines the radial direction and speed of the read/write heads 24a–h.

When data to be written or read from one of the storage disks 22a–d are stored in a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

When the actuator has moved the read/write heads 24a–h to the destination data track, a multiplexer (not shown) is used to couple the head 24a–h, over the specific data track to be written or read, to the read/write control 36, as is generally known in the art. The read/write control 36 includes a read channel that, in accordance with modern disk drive design, comprises an electronic circuit that detects information represented by magnetic transitions recorded on the disk surface within the radial extent of the selected data track. As described above, each data track is divided into a number of data sectors.

During a read operation, electrical signals transduced by the head from the magnetic transitions of the data sectors are input to the read channel of the read/write control 36 for processing. The RAM 43 can be used to buffer data read from or to be written to the data sectors of the storage disks 22a–d via the read/write control 36. The buffered data can be transferred to or from a host computer utilizing the disk drive for data storage.

Figure 3:
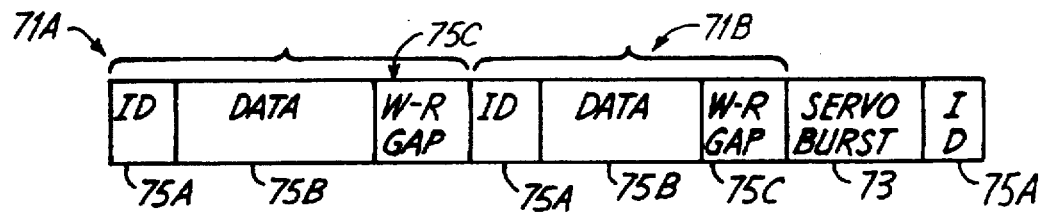
FIG. 3 is a diagrammatic explosion of the format and constituency of representative prior art data and servo sectors as recorded within the data tracks of the disks of the disk drive of FIG. 1.

Referring to FIG. 3, a portion of a typical track format is shown. The track format includes one or more data sectors 71a–b. In this embodiment of the present invention, a sectored servo (or embedded servo) format is shown. In a sectored servo format, servo information (such as servo burst 73) is used by the actuator control 40 (FIG. 2) to position the read/write head 24 over the appropriate track. One or more servo bursts appear at various locations in each track. It will be appreciated by one of ordinary skill in the art that the present invention can be easily applied to other servo formats such as the well-known dedicated servo system.

The data sector 71a–b includes a plurality of fields 75a–c. In this example those fields include an ID field 75a, which includes identification information for the given data sector. A data field 75b typically stores user (or customer) data. As described above, the write-to-read gap field 75c provides a timing delay to allow the head to change from a write to a read operation. During a typical write operation, user data is written to the data sector (e.g., data sector 71a) of a given track in the data field 75b. When the end of the data field 75b is reached, the disk drive should change to a read operation so as to read the ID field 75a of the next data sector 71b. The write-to-read gap field 75c appears under the head while this change of operation occurs. If the data sector 71b is defective, the ID field 75a will include information informing the drive as to an alternate location where the data sought can be found (for a read operation) or where the data is to be stored (for a write operation). The disk drive, specifically the actuator control 40 (FIG. 2), positions the head 24 to the alternate location so that the read or write operation can be continued.

Figure 4:
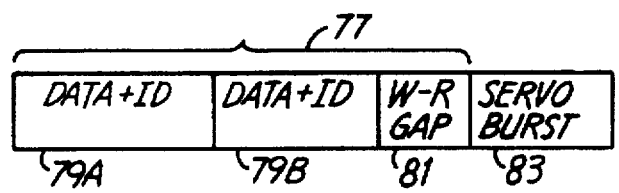
FIG. 4 is a diagrammatic explosion of the format and constituency of a merged identification format with servo sectors, as recorded within the data tracks of the disks of the disk drive of FIG. 1.

Referring to FIG. 4, a merged identification format is shown for a data sector 77. In the merged ID format, ID information exists among the information in one or more data fields 79a–b of the sector 77. During a read operation using this format, ID and data information are read together from the data fields 79a–b. After both types of information are read, the drive determines whether the proper data sector has been read by comparing the read ID value with the target ID. If the ID's match, the read data is simply passed to the host.

In the merged ID format, ID information in the data fields 79a–b does not contain defect information. Rather, defect information is stored in a memory device such as a random access memory (RAM). To access this information, the ID information must be compared with the information stored in the RAM to determine whether that particular data sector is defective, and if so, what alternate data sector is to be used for read and write operations for the particular data sector. In the data format of FIG. 3, valuable disk space is lost in order to store defect information. In the data format of FIG. 4, processing time delay occurs because each ID must be checked via the memory device to determine if the data sector is defective.

In a headerless (or "ID-less") format, ID information is stored or kept track of, off-disk in a memory device. Defect information is also stored off disk. As with the data format of FIG. 4, all ID information must be checked with the defect information stored off disk, which adds to processing time delay.

Figure 5:
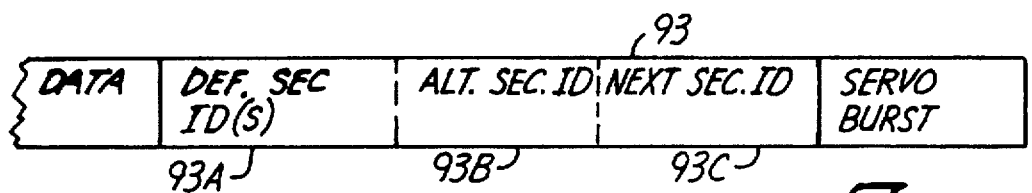
FIG. 5 is a detailed view of the write-to-read gap prepared according to the present invention.

The format of the present invention is shown in FIG. 5 and saves both disk space and processing time delay. When it is determined that a data sector is defective, according to a feature of the present invention, defect information can be written into at least one of the gap fields, such as a sector gap field, or more particularly a write-to-read gap field 93. The defect information includes one or more of the following: the identification of which sector in a given track is bad (93a), the identification of an alternate track and/or sector to be used instead of the defective sector (93b), orientation information (93c) (e.g., the sector number of the sector following the defective sector), etc.

The present invention eliminates the requirement for a memory, such as a RAM to store defect information. However, one skilled in the art will appreciate that an off-disk memory can be used in conjunction with the method and apparatus of the present invention. In an implementation of the present invention, the defect information written on the disk only indicates which data sector or sectors are defective for the track. Given this defect information, an off-disk memory device, such as a RAM can be used to store alternative track locations for the defective sectors only. Therefore, only comparisons need to be made between defective sector locations and the locations stored in the memory rather than making comparisons of all sectors. To save the most in processing time, with respect to the off-disk memory, defect information and alternate sector information should be stored on the disk as described herein.

Figure 6:
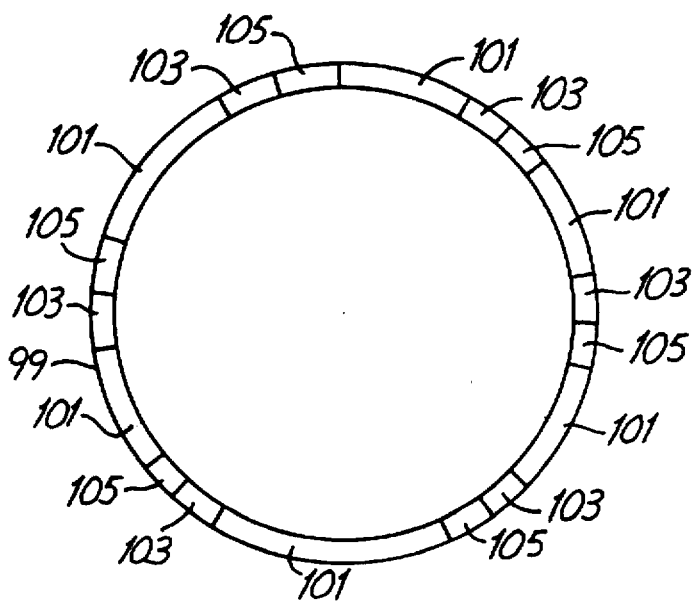
FIG. 6 is view of a full track on a disk surface for employing the method and apparatus of the present invention.

During a seek operation, especially during settle mode, the head will typically pass over the destination track more than once. Thus, there is a probability that the head will pass over, and defect information will be read from, the write-to-read gap 93 that contains this defect information. Once the defect information is read and an alternate sector location is determined, the head is moved by the actuator control 40 (FIG. 2) to the alternate sector location. It will be appreciated by one skilled in the art that placing the same or similar information from the write-to-read gap 93 in other write-to-read gaps in the same track will improve the aforementioned probability that the head will pass over and read this defect information. As seen in FIG. 6, an example of a track 99 on a disk surface is shown (not drawn to scale). Defect information can be placed in one or more of the write-to-read gaps 103 of the track 99. In this embodiment write-to-read gaps appear between data fields 101 and servo burst fields 105. In many embedded servo drives, one or more servo burst fields 105 appear within a single data field. The more write-to-read gaps that contain defect information in the track 99, the greater the probability that this information will be read when the head passes over the track 99.

One skilled in the art will appreciate that many modifications can be made to the embodiment of the invention described. For example, the defect information can be written in a variety of locations and fields in a track other than in the sector gap or write-to-read gap. For instance, the defect information can be written in what is referred to in the art as a speed gap which accounts for variations in spindle speed of the disk drive motor. When writing defect information into fields in the track (even the write-to-read gaps), it may be necessary to use a unique string of bits in the defect information to differentiate it from other types of information that appear in the track (e.g., user data information, address mark information, etc.). Defect information written in fields in a track can indicate all of the defective data sectors for the track rather than just the data sector closest to the location of the defect information.

The conventional data format of FIG. 3 can be modified so that defect information is not stored in the ID field, but is rather stored in the write-to-read gap. Such a modification improves disk capacity by making the ID field smaller (thus allowing more room for user data). Overall, however, a large memory (such as a RAM) to store defect information is not necessary. Thus, less memory is needed for storing defect information and less processing time is needed to process this type of information.

What is claimed is:

1. In a disk drive including at least one disk having a plurality of concentric tracks on a surface of the disk, each of the concentric tracks having a plurality of data sectors such that data may be written to and read from each of the plurality of data sectors in a data format, each of the concentric tracks having a plurality of gap fields arranged so that there is at least one gap field between successive data sectors on the concentric track, a method of storing and retrieving defect information from the first concentric track comprising:

writing defect information, with a read/write head, in the at least one gap field in the first concentric track; and thereafter, reading the defect information with a read/write head.

2. The method of claim 1 wherein the at least one gap field is a write-to-read gap field.

3. The method of claim 1 wherein the defect information includes control information to operate the disk drive to move the read/write head to an alternate data sector.

4. The method of claim 1 wherein the defect information comprises identification information selected from the group comprising identification of a defective data sector of the first concentric track, identification of an alternate sector to be used in place of a defective sector of the first concentric track, and identification of a data sector following a defective data sector.

5. The method of claim 1 wherein the defect information written into the at least one gap field comprises defect information for the entire respective track.

6. The method of claim 1 wherein each of the plurality of gap fields on each concentric track contains all of the defect information for the entire respective track.

7. In a disk drive device, a disk for storing information in the disk drive device comprising:

at least one disk surface having a plurality of concentric tracks on a surface of the disk, such that data may be written to and read from a plurality of data sectors in at least a first concentric track of the concentric tracks in a data format; and a plurality of gap fields in the disk surface separate from any one of the data sectors, at least one gap field being between successive data fields; and read/write head arranged in the disk drive for reading and writing data from and to the disk surface;

the read/write head being operated to write defect information into at least one gap field.

8. The disk drive of claim 7 wherein the at least one gap field is a write-to-read gap field.

9. The disk drive of claim 7 wherein the defect information includes control information, the disk drive having an actuator arm responsive to the control information to move the read/write head to an alternate data sector.

10. The disk drive of claim 7 wherein the defect information comprises identification information selected from the group comprising identification of a defective data sector of the first concentric track, identification of an alternate sector to be used in place of a defective sector of the first concentric track, and identification of a data sector following a defective data sector, the disk drive including an actuator arm control responsive to the defect information to move the read/write head to an alternate data sector.

11. The disk drive of claim 7 wherein the read/write head is operated to write defect information for an entire track written into the at least one gap field on the respective track.

12. The disk drive of claim 7 wherein the read/write head is operated to write defect information for an entire track written into a plurality of gap fields on the respective track.

13. A disk drive comprising:

at least one disk having a plurality of concentric tracks on a surface of the disk, each of the plurality of tracks having a plurality of data sectors such that data may be written to and read from a plurality of data sectors in each of the plurality of concentric tracks in a data format, wherein selected data sectors in a track may not be used, each track having a plurality of gap fields such that a gap field is positioned on the track between successive data sectors, at least one gap field of each of the plurality of concentric tracks containing defect information for the respective track from which the selected data sectors in the track may be identified;

a read/write head coupled within disk drive to confront a track of the plurality of tracks, the read/write head capable of writing data to data sectors on the track and capable of reading data from data sectors and gap fields on the track;

the disk drive being responsive to defect information read by the read/write head in a gap field to identify the selected data sectors in the respective track and to prevent reading data from and writing data to the identified selected data sectors.

14. The disk drive of claim 13 wherein each of the plurality of gap fields on each of the plurality of tracks contains defect data from which all of the selected data sectors in the respective track may be identified.

15. The disk drive of claim 14 wherein the gap fields are write-to-read gap fields.

16. A disk drive comprising:

at least one disk having a plurality of concentric tracks on a surface of the disk, each of the plurality of tracks having a plurality of data sectors such that data may be written to and read from a plurality of data sectors in each of the plurality of concentric tracks in a data format, wherein selected ones of the data sectors in a track may not be used, each track having a plurality of write-to-read gap fields such that a write-to-read gap field is positioned on the track between successive data sectors, each write-to-read gap field of each of the plurality of concentric tracks containing all defect information for the respective track from which all of the selected data sectors in the track may be identified;

a read/write head coupled within disk drive to confront a track of the plurality of tracks, the read/write head being capable of writing data to data sectors on the track and capable of reading data from data sectors and write-to-read gap fields on the track;

the disk drive being responsive to defect information read by the read/write head in any one of the write-to-read gap fields in a track to identify all of the selected data sectors in the respective track and to prevent reading data from and writing data to the identified selected data sectors.

17. In a disk drive including at least one disk having a plurality of concentric tracks on a surface of said disk such that data is capable of being written to and read from a plurality of data sectors in at least a first concentric track of said concentric tracks, a method of storing and retrieving defect information from said first concentric track comprising:

determining whether a first data sector in said first concentric track is defective;

writing defect information, with a read/write head, in a gap field in said first concentric track when said first data sector is defective, such that said defect information indicates that said first data sector is defective; and reading said defect information with a read/write head, such that the disk drive is prevented from reading data from and writing data to said first data sector when said first data sector is defective.

18. The method of claim 17 wherein said gap field is a sector gap field.

19. The method of claim 18 wherein said sector gap field is a write-to-read gap located between data sectors or between a data sector and a servo sector.

20. The method of claim 17 wherein in said writing step, said defect information is written in more than one gap field in said first concentric track.

21. The method of claim 20 wherein in said writing step, said defect information is written to all of the gap fields in said first concentric track.

22. The method of claim 17 wherein said defect information indicates an alternative sector address, the method further comprising:

moving said read/write head to a second data sector in a second concentric track of said concentric tracks as a function of the alternate sector address.

23. The method of claim 17 wherein said read/write head is a magnetoresistive head.

24. In a disk drive including at least one disk having a plurality of concentric tracks on a surface of said disk, such that data is capable of being written to and read from a plurality of data sectors in at least a first concentric track of said concentric tracks in a headerless data format, a method of storing and retrieving defect information from said first concentric track comprising:

determining whether a first data sector having a headerless data format in said first concentric track is defective;

writing defect information, with a read/write head, in a gap field in said first concentric track when said first data sector is defective, such that said defect information indicates that said first data sector is defective; and reading said defect information with a read/write head, such that the disk drive is prevented from reading data from and writing data to said first data sector when said first data sector is defective.

25. The method of claim 24 wherein said gap field is a sector gap field.

26. The method of claim 25 wherein said sector gap field is a write-to-read gap located between data sectors or between a data sector and a servo sector.

27. The method of claim 25 wherein in said writing step, said defect information is written to more than one gap field in said first concentric track.

28. The method of claim 27 wherein in said writing step, said defect information is written to all of the gap fields in said first concentric track.

29. The method of claim 24 wherein in said writing step, said defect information is written to more than one gap field in said first concentric track.

30. The method of claim 29 wherein in said writing step, said defect information is written to all of the gap fields in said first concentric track.

31. The method of claim 24 wherein said defect information indicates an alternate sector address, the method further comprising:

moving said read/write head to a second data sector in a second concentric track of said concentric tracks as a function of the alternate sector address.

32. The method of claim 24 wherein said read/write head is a magnetoresistive head.

33. In a disk drive including at least one disk having a plurality of concentric tracks on a surface of said disk, such that data is capable of being written to and read from a plurality of data sectors in at least a first concentric track of said concentric tracks in a merged identification data format, a method of storing and retrieving defect information from said first concentric track comprising:

determining whether a first data sector having a merged identification data format in said first concentric track is defective;

writing defect information, with a read/write head, in a gap field in said first concentric track when said first data sector is defective, such that said defect information indicates that said first data sector is defective; and reading said defect information with a read/write head, such that the disk drive is prevented from reading data from and writing data to said first data sector when said first data sector is defective.

34. The method of claim 33 wherein said gap field is a sector gap field.

35. The method of claim 34 wherein said sector gap field is a write-to-read gap located between data sectors or between a data sector and a servo sector.

36. The method of claim 35 wherein in said writing step, said defect information is written to more than one gap field in said first concentric track.

37. The method of claim 33 wherein in said writing step, said defect information is written to all of the gap fields in said first concentric track.

38. The method of claim 33 wherein said defect information indicates an alternate sector address, the method further comprising:

moving said read/write head to a second data sector in a second concentric track of said concentric tracks as a function of the alternate sector address.

39. The method of claim 33 wherein said read/write head is a magnetoresistive head.

40. In a disk drive device, an apparatus for storing and retrieving defect information in said disk drive device comprising:

at least one disk having a plurality of concentric tracks on a surface of said disk, such that data is capable of being written to and read from a plurality of data sectors in at least a first concentric track of said concentric tracks in a data format, and a read/write head coupled within said disk drive, said read/write head capable of writing data to and reading data from said first concentric track on the surface of said disk;

said disk drive determines whether a first data sector having a data format in said first concentric track is defective, such that defect information is written with said read/write head in a gap field in said first concentric track when said first data sector is defective, said defect information indicating that said first data sector is defective; and said read/write head reading said defect information with a read/write head, such that the disk drive is prevented from reading data from and writing data to said first data sector when said first data sector is defective.

41. The apparatus of claim 40 wherein said data format is a headerless data format.

42. The apparatus of claim 40 wherein said format is a merged identification format.

43. The apparatus of claim 40 wherein said gap field is a sector gap field.

44. The apparatus of claim 43 wherein said gap field is a write-to-read gap field located between data sectors or between a data sector and a servo sector.

45. The apparatus of claim 43 wherein said defect information is written to more than one sector gap field in said first concentric track.

46. The apparatus of claim 45 wherein said defect information is written to all of the sector gap fields in said first concentric track.

47. The apparatus of claim 45 wherein said defect information indicates an alternate sector address, such that said read/write head is moved to a second data sector in a second concentric track of said concentric tracks as a function of the alternate sector address.

48. The apparatus of claim 40 wherein said read/write head is a magnetoresistive head.

* * * * *